US008004553B2

(12) United States Patent
Hayashi et al.

(10) Patent No.: US 8,004,553 B2

(45) Date of Patent: Aug. 23, 2011

(54) OPTICAL SCANNING DEVICE, OPTICAL SCANNING METHOD, AND IMAGE FORMING APPARATUS, USING THE OPTICAL SCANNING DEVICE

(75) Inventors: Eiichi Hayashi, Atsugi (JP); Go Takahashi, Ebina (JP); Kan Aoki, Yamato (JP)

(73) Assignee: Ricoh Company Limited, Tokyo (JP)

( * ) Notice: Subject to any disclaimer, the term of this patent is extended or adjusted under 35 U.S.C. 154(b) by 154 days.

(21) Appl. No.: 12/371,002

(22) Filed: Feb. 13, 2009

(65) Prior Publication Data

US 2009/0231410 A1 Sep. 17, 2009

(30) Foreign Application Priority Data

Mar. 14, 2008 (JP) ................................ 2008-066704

(51) Int. Cl.
*B41J 15/14* (2006.01)
*B41J 27/00* (2006.01)

(52) U.S. Cl. ....................................... 347/244; 347/258

(58) Field of Classification Search .................. 347/230, 347/241–244, 256–258; 359/662, 667
See application file for complete search history.

(56) References Cited

U.S. PATENT DOCUMENTS 5,781,323 A * 7/1998 Takada et al. ............. 359/206.1
6,015,514 A * 1/2000 Koseko ....................... 264/40.1
6,287,504 B1 9/2001 Kanematsu et al.
6,657,761 B2 * 12/2003 Suzuki et al. .............. 359/205.1
6,919,120 B2 7/2005 Yamanaka et al.
7,525,710 B2 * 4/2009 Atsuumi et al. ........... 359/207.1
7,825,947 B2 * 11/2010 Kimura ......................... 347/243
2006/0262372 A1 11/2006 Hayashi
2007/0216983 A1 9/2007 Hayashi et al.
2008/0049287 A1 2/2008 Kimura et al.

FOREIGN PATENT DOCUMENTS

CN 1197722 A 11/1998
CN 1847917 A 10/2006
JP 11-28745 2/1999
JP 2000-84945 3/2000
JP 2000-141413 5/2000
JP 2002-337178 11/2002
JP 2005156879 A * 6/2005

* cited by examiner

*Primary Examiner* — Hai C Pham

(74) *Attorney, Agent, or Firm* — Oblon, Spivak, McClelland, Maier & Neustadt, L.L.P.

(57) ABSTRACT

An optical scanning device for guiding a light beam to a member to scan the member with the light beam, including a light source emitting the light beam; a light deflector deflecting the light beam; a focusing optical system including a plastic optical element molded using a die. The optical element has least two transfer surfaces formed by contacting with transfer surfaces of the die and including a light entrance surface and a light exit surface; and a third surface including a non-transfer surface formed without contacting a transfer surface of the die. The light beam passes through the optical element in such a manner that the optical axis center of the light beam extends in a direction parallel to the shorter side of the optical element while being shifted from the dimensional center of the optical element toward the third surface of the optical element.

5 Claims, 6 Drawing Sheets

36
35
36
28
26
29
27
36
15
36

OPTICAL SCANNING DEVICE, OPTICAL SCANNING METHOD, AND IMAGE FORMING APPARATUS, USING THE OPTICAL SCANNING DEVICE

BACKGROUND OF THE INVENTION

1. Field of the Invention

The present invention relates to an optical scanning device for scanning a member with a light beam to guide the light beam to a predetermined position of the member using a plastic optical element. In addition, the present invention also relates to an optical scanning method. Further, the present invention relates to an image forming apparatus using the optical scanning device.

2. Discussion of the Background

Optical image writing units used for conventional laser digital copiers, printers and facsimiles typically include an optical element having a rectangular form, which focuses a laser beam and which has varieties of correction functions.

Recently, due to needs for cost reduction, the material of such optical elements has been changed from glass to plastics. In addition, the optical elements have varieties of surfaces of from spherical surfaces to complex non-spherical surfaces so that the desired plural functions can be performed with a minimum number of optical elements. For example, varieties of lenses such as lens with large thickness and/or uneven thickness in the longitudinal direction thereof have been used as the optical elements. Such a plastic optical element can be mass-produced at a low cost by inserting a resin in a cavity of a die having the form of the plastic element or injecting a melted resin to the cavity.

In such conventional plastic molding methods, it is preferable that the pressure applied to the resin in the cavity of the die and the temperature of the resin therein have to be controlled so as to be uniform in the cooling/solidifying process of the melted resin in the cavity to prepare a plastic element having a desired form and a high-dimensional precision. However, when a lens with an uneven thickness form is formed by this method, a sink problem in that the portions of the lens having different thicknesses have different amounts of volume contraction, resulting in formation of a lens with a poor dimensional precision and formation of sink on a thicker portion of the lens is caused.

When a technique such that in an injection molding method the injection pressure is increased to increase the amount of the resin injected into the cavity of the die is used to solve the problem, the internal strain of the molded plastic element seriously increases particularly in a case where the plastic element has large thickness or uneven thickness, resulting in deterioration of the optical properties of the plastic element.

Thus, when the injection pressure is decreased to decrease the amount of the resin injected into the cavity, the sink problem is caused. In contrast, when the injection pressure is increased to increase the amount of the resin injected into the cavity, the internal strain of the molded plastic element increases.

A published unexamined Japanese patent application No. (hereinafter referred to as JP-A) 2000-84945 corresponding to U.S. Pat. No. 6,919,120 discloses a technique in that a recessed portion or a projected portion is formed on a surface other than the transfer surfaces of the resin element to reduce the internal pressure and the internal strain of the resin. In this regard, the recessed portion is sometimes referred to as a non-transfer surface. By using this technique, plastic elements with a high mechanical precision can be produced at low costs even when the plastic elements have large thickness and/or uneven thickness.

Specific examples of the method for use informing a recessed portion (i.e., non-transfer surface) on a surface other than transfer surfaces include the methods disclosed in JP-As 2000-141413 and 11-28745 (corresponding to U.S. Pat. No. 6,015,514). Specifically, a die in which a cavity is formed by one or more transfer surfaces of a fixed cavity piece and another surface including a non-transfer surface (for forming a recessed portion) formed by a slidable cavity piece is used. A melted resin heated to a temperature higher than the softening point thereof is injected into the cavity while the temperature of the die is controlled to be lower than the softening point of the resin. The injected resin is contacted with the transfer surfaces of the die due to pressure applied to the resin, resulting in transfer of the transfer surfaces to the surfaces of the injected resin. After the resin is cooled to a temperature lower than the softening point thereof, the slidable cavity piece is slid so as to be separated from the resin (i.e., from the cavity) to forcibly form an air gap between a surface of the resin and the slidable cavity piece, i.e., to form a recessed portion (non-transfer surface) on a surface of the resin.

When an plastic element is molded by a general molding method, internal strains and deviations (birefringence) thereof are caused in the longer side direction and in the shorter side direction of the molded element, and thereby the optical properties of the plastic element deteriorate (for example, the beam spot diameter widens). In this regard, the internal strain includes:

(1) An internal strain caused due to orientation of the injected resin in the flowing direction of the resin; and (2) Another internal strain caused by the stress in the die used.

It is well known that the optical properties of the element are greatly affected by the latter internal strain.

By using the molding methods proposed by JP-As 2000-141413 and 11-28745, the absolute amount of the internal strain in the molded element decreases, but a problem in that the deviation (birefringence) in the shorter side direction of the molded element is greater than that in general molding methods occurs. This is because stress is relieved at the non-transfer surface side of the die (i.e., internal strain at the non-transfer surface side is lower than that in the peripheral portions of the non-transfer surface side), thereby increasing the deviation of the internal strain (i.e., birefringence) in the shorter side direction of the molded optical element. This optical property deterioration problem (particularly, the beam spot widening problem) is prominently caused in high resolution image forming apparatus.

Because of these reasons, a need exists for a molded plastic optical element having good optical properties or an optical scanning device which can maximize the utilization of a molded plastic optical element.

SUMMARY OF THE INVENTION

As an aspect of the present invention, an optical scanning device for guiding light to a predetermined position of a member to scan the member with light is provided. The optical scanning device includes:

a light source configured to emit a light beam;

a light deflector configured to deflect the light beam;

a focusing optical system configured to guide the deflected light beam to the predetermined position of the member and including a plastic optical element.

The plastic optical element is molded using a die and includes:

two transfer surfaces, which are formed by contacting with transfer surfaces of the die and which include:

a light entrance surface from which the light beam enters; and a light exit surface from which the light beam exits; and a third surface including a non-transfer surface formed without contacting a surface of the die.

In the optical scanning device, the deflected light beam passes through the plastic optical element in such a manner that the optical axis center of the plastic optical element extends in a direction parallel to the shorter side of the plastic optical element while being shifted from the dimensional center thereof toward the third surface.

As another aspect of the present invention, an optical scanning method for guiding light to a predetermined position of a member to scan the member with light is provided, which includes:

emitting a light beam;

deflecting the light beam; and guiding the deflected light beam to the member through the plastic optical element mentioned above in such a manner that the optical axis center of the deflected light beam extends in a direction parallel to the shorter side of the plastic optical element while being shifted from the dimensional center of the plastic optical element toward the third surface thereof having a non-transfer surface.

As yet another aspect of the present invention, an image forming apparatus is provided which includes:

an image bearing member configured to bear an electrostatic image thereon;

the above-mentioned optical scanning device configured to guide a light beam to a predetermined position of the image bearing member and to scan the image bearing member with the light beam to form the electrostatic image on the surface of the image bearing member.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

At first, the optical scanning device for use in the optical scanning device of the present invention will be explained by reference to FIGS. 1-7.

Figure 1:
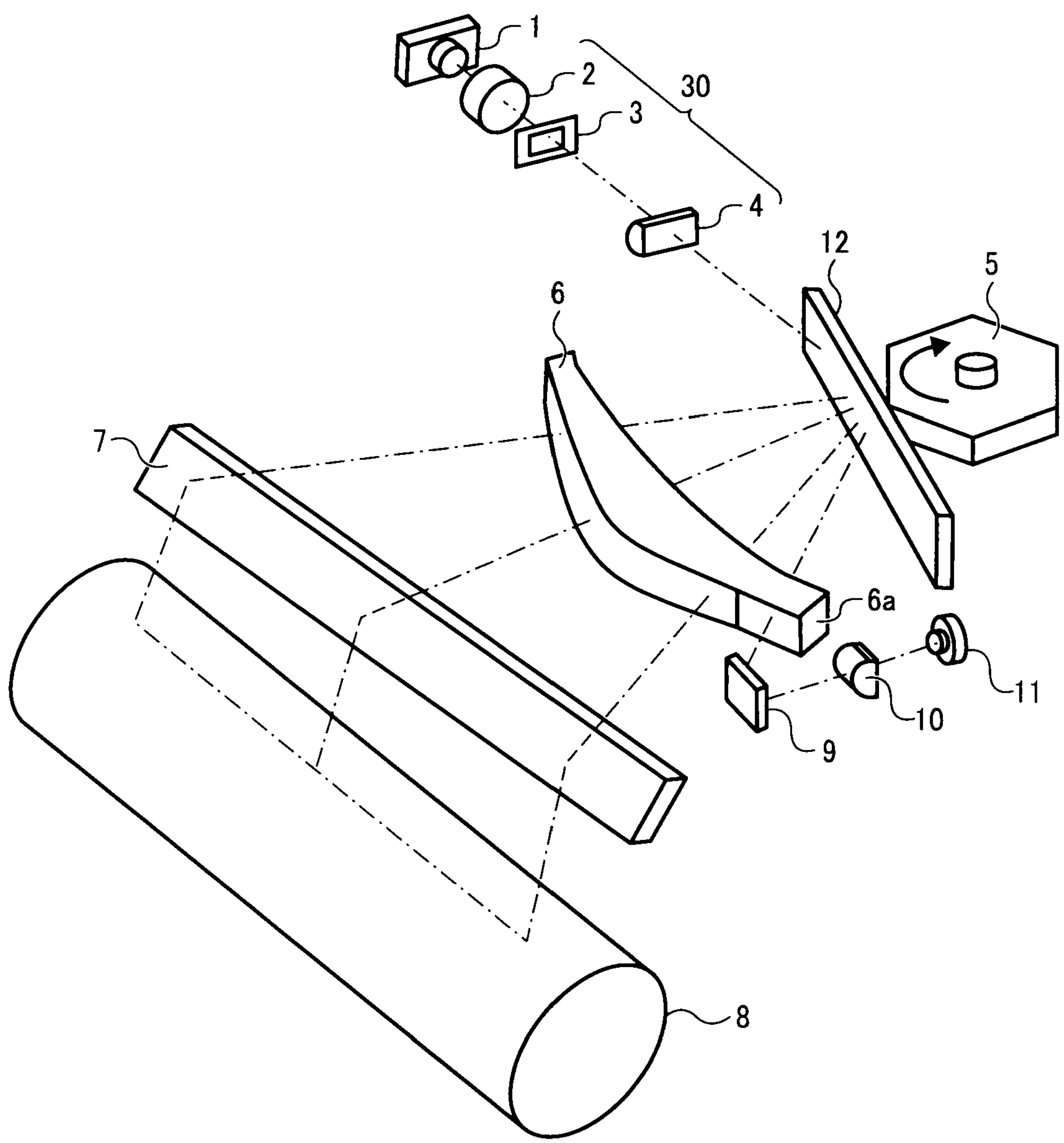
FIG. 1 is a schematic perspective view illustrating the main portion of an example of the optical scanning device of the present invention.

FIG. 1 illustrates the main portion of an example of the optical scanning device of the present invention. A light source 1 (a laser diode in this case) emits a diverging light beam, and the light beam is then coupled by a coupling lens 2 for subsequent optical elements. In this regard, the light source 1 has only one light emitting point only for explanation purpose. However, the light source of the optical scanning device of the present invention is not limited thereto, and can have plural light emitting points.

The light beam passing through the coupling lens 2 enters an opening of an aperture 3 so that the peripheral portion of the light beam is cut by the aperture to be reshaped. The thus reshaped light beam enters a cylindrical lens 4 serving as a linear image focusing optical system. The cylindrical lens 4 is arranged in such a way that the direction thereof having no power (i.e., the direction having no curvature) is parallel to the main scanning direction and the direction thereof having a positive power (i.e., the direction having a curvature) is parallel to the sub-scanning direction, and focuses the light beam in the sub-scanning direction so that the focused light beam forms a long line image (in the horizontal (main scanning) direction) on a deflecting surface of a polygon mirror 5 serving as a deflector.

The coupling lens 2, aperture 3, and cylindrical lens 4 constitute a pre-deflection optical system 30 (i.e., inlet optical system).

The light beam reflected from the surface of the polygon mirror 5 is deflected at a constant angular velocity due to constant velocity rotation of the polygon mirror. The thus deflected light beam transmits a scanning lens (fθ lens) 6, which is a plastic optical element and which constitutes a focusing optical system, and the path of the light beam is then changed by a bending mirror 7 so that the light beam scans a surface of a photoreceptor drum 8, which serves as an image bearing member to be scanned, in the main scanning direction. In this example, only one scanning lens constitutes the focusing optical system. However, the focusing optical system of the optical scanning device of the present invention is not limited thereto, and may be constituted of plural scanning lenses.

A transparent optical element 12 having no power is provided on a case (not shown) surrounding the polygon mirror 5.

Prior to the light scanning operation, the deflected light beam is reflected from a synchronizing mirror 9, and the reflected light beam is then focused on a synchronization detector 11 in the main scanning direction by a synchronizing lens 10. The light scanning operation (i.e., the image writing operation) is started on the basis of an output signal output from the synchronization detector 11.

The scanning lens 6 includes a non-power portion 6*a* having no power in the main scanning direction.

Figure 2:
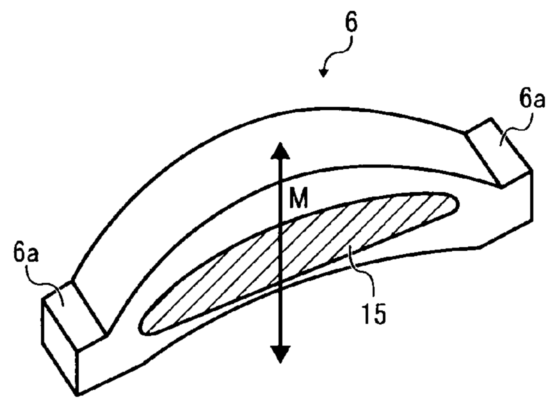
FIG. 2 is a schematic perspective view illustrating an example (fθ lens) of the plastic optical element of the optical scanning device of the present invention.

FIG. 2 is a perspective view illustrating the scanning lens (i.e., fθ lens) 6 from the lower side thereof. A portion 15 illustrated with hatched lines is a recessed portion (i.e., non-transfer surface) of the fθ lens.

Next, the method for forming the recessed portion 15 by performing incomplete transfer by applying compressed air to a molded article will be explained.

Figure 3:
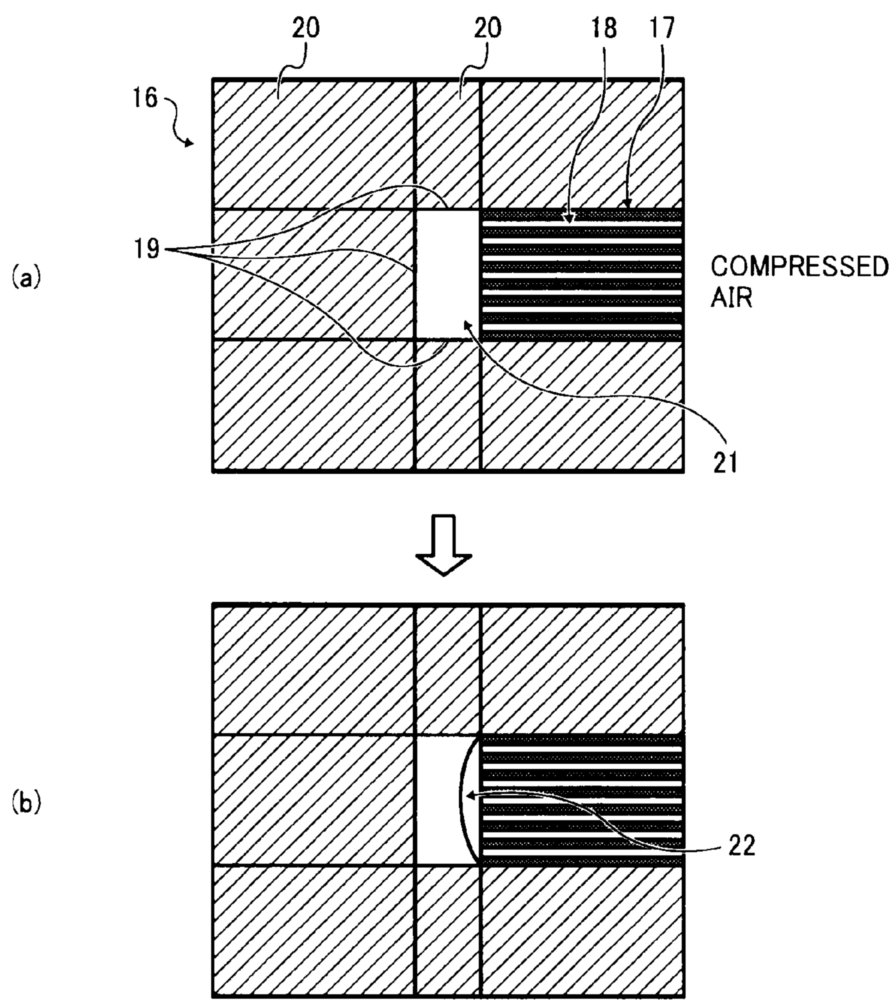
FIG. 3 is a schematic view for explaining a method for molding a plastic optical element for use in the present invention.

As illustrated in FIG. 3, a die 16 includes a cavity piece 17 for forming a surface including the recessed portion 15 on the molded article. The cavity piece 17 has at least one air hole 18, which is connected with at least one communicating tube connected with a compressed air supplying device (not shown) located outside of the die 16.

The die 16 includes plural cavity pieces 20, and transfer surfaces 19 of the plural cavity pieces 20 to form a cavity. After the die is closed, a resin 21, which is melted by being heated to a temperature higher than the softening point thereof, is injected into the cavity while the temperature of the die 16 is controlled to be lower than the softening point of the injected resin. After the resin is injected, the resin is pressed at a predetermined pressure so as to be well contacted with the transfer surfaces 19 (i.e., a pressure maintenance process). The resin is then cooled to a temperature lower than the softening point thereof. In this case, compressed air is supplied to the resin in the cavity from the air hole 18 to forcibly form an air gap 22 between the resin 21 and the cavity piece 17, resulting in formation of the recessed portion 15. After the cooling process, the die is opened to pull the molded resin out of the die.

Since the air gap 22 is formed between the resin 21 and the cavity piece 17, the surface of the resin facing the gap 22 becomes a free surface, and thereby the surface can move relatively easily compared to the surfaces of the resin contacted with the transfer surfaces 19. As a result, heat shrinkage of the resin due to cooling of the resin can be absorbed by the movement of this surface portion of the resin. Namely, the surface portion is sunk by priority, and thereby the internal strain is relieved while preventing sinking of the surfaces of the resin at the transfer surfaces 19.

Next, the method for forming the recessed portion 15 by performing incomplete transfer by sliding a cavity piece will be explained by reference to FIG. 4.

Figure 4:
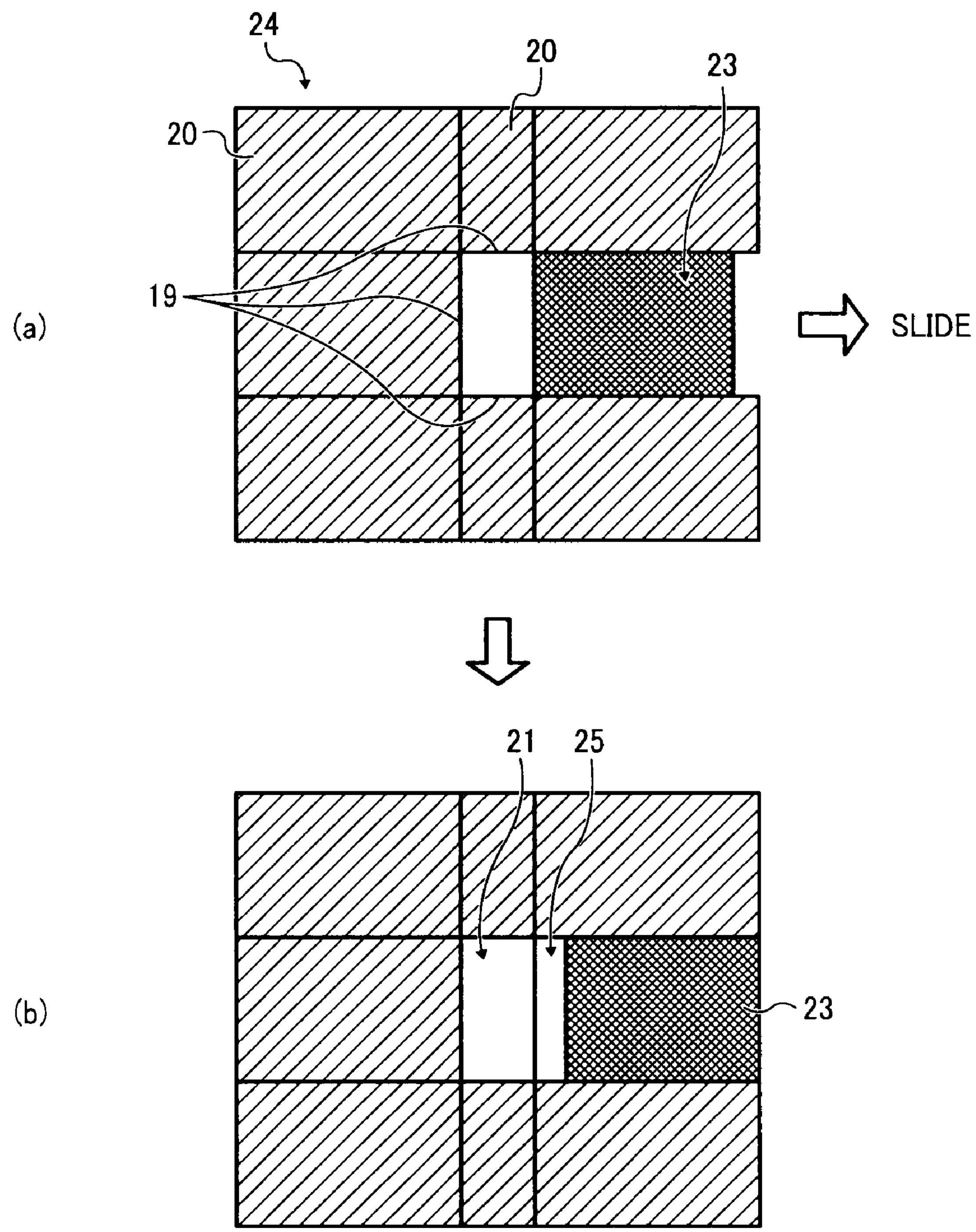
FIG. 4 is a schematic view for explaining another method for molding a plastic optical element for use in the present invention.

Referring to FIG. 4, a die 24 includes the plural cavity pieces 20, and transfer surfaces 19 of the plural cavity pieces 20 to form a cavity. In addition, the die 24 includes a slidable cavity piece 23 for forming a surface including a recessed portion on the injected resin 21.

The resin 21, which is melted by being heated to a temperature higher than the softening point thereof, is injected into the cavity while the temperature of the die 24 is controlled to be lower than the softening point of the injected resin. After the resin is injected, the resin is pressed at a predetermined pressure so as to be well contacted with the transfer surfaces 19. The resin is then cooled to a temperature lower than the softening point thereof. In this case, the slidable cavity piece 23 is slid so as to be separated from the resin 21 to forcibly form an air gap 25 between the resin 21 and the slidable cavity piece 23, resulting in formation of a recessed portion 15 on the surface of the resin.

Since the air gap 25 is formed between the resin 21 and the slidable cavity piece 23, the surface of the resin facing the gap 25 becomes a free surface, and thereby the surface can move relatively easily compared to the surfaces of the resin contacted with the transfer surfaces 19. As a result, heat shrinkage of the resin due to cooling of the resin can be absorbed by the movement of this surface portion of the resin. Namely, the surface portion of the resin is sunk by priority, and thereby the internal strain is relieved while preventing sinking of the surfaces of the resin at the transfer surfaces 19.

Figure 5:
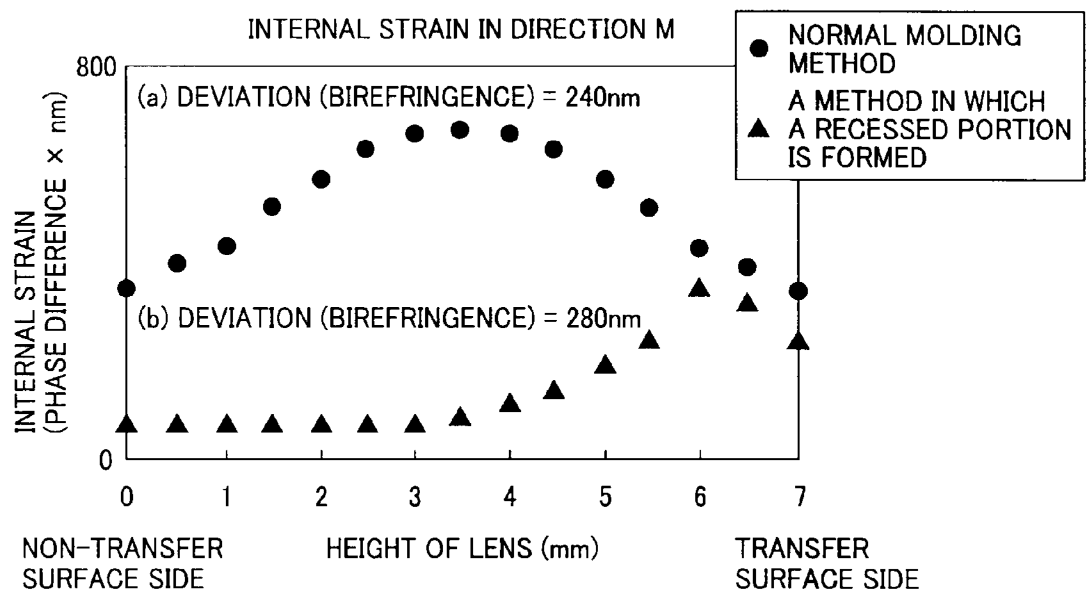
FIG. 5 is a graph illustrating the difference in internal strain between two plastic optical elements prepared by different molding methods.

The internal strain profile of the thus prepared fθ lens 6 in the shorter side direction thereof (i.e., in the direction M illustrated in FIG. 2) is illustrated in FIG. 5 while compared with the internal strain profile of a fθ lens prepared by a conventional molding method in which no recessed portion is formed. It is clear from FIG. 5 that by forming a recessed portion, the absolute amount of the internal strain of the molded fθ lens can be reduced by about 70% but the deviation (birefringence) increases by about 20% (i.e., 280/240).

Figure 6:
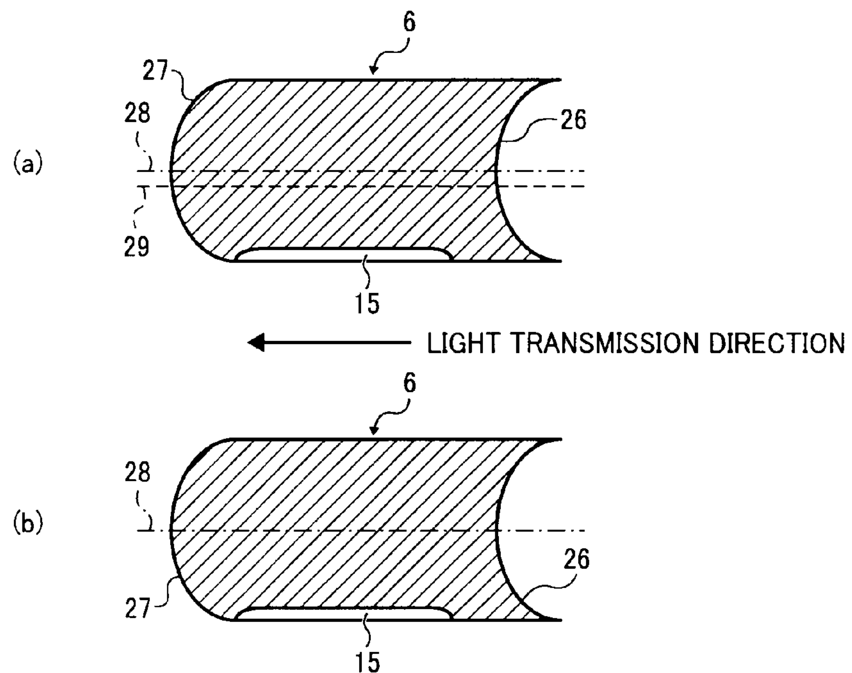
FIG. 6 is a schematic view for explaining shifting of an optical axis center of a plastic optical element.

In order to prevent occurrence of the deviation increasing problem, as illustrated in FIG. 6(6(*a*)), the center of the optical axis in the shorter side direction of the fθ lens is shifted from the dimensional center of the fθ lens toward anon-transfer surface having the recessed portion 15.

Specifically, in FIG. 6 (6(*a*)), a numeral 26 denotes a light entrance surface (one of transfer surfaces) of the fθ lens 6, and a numeral 27 denotes a light exit surface (one of transfer surfaces) of the fθ lens. In addition, a numeral 28 denotes a dimensional center of the fθ lens 6, and a numeral 29 denotes an optical axis center of the fθ lens in the shorter side direction thereof. The fθ lens 6 has a non-transfer surface having the recessed portion 15 formed by the above-mentioned methods. As illustrated in FIG. 6 (6(*a*)), the optical axis center 29 of the fθ lens 6 is shifted from the dimensional center 28 thereof toward the non-transfer surface having the recessed portion 15. In contrast, in the conventional layout of the fθ lens illustrated in FIG. 6 (6(*b*)), the position of the optical axis center of the fθ lens is substantially identical to that of the dimensional center 28 of the fθ lens.

Figure 7:
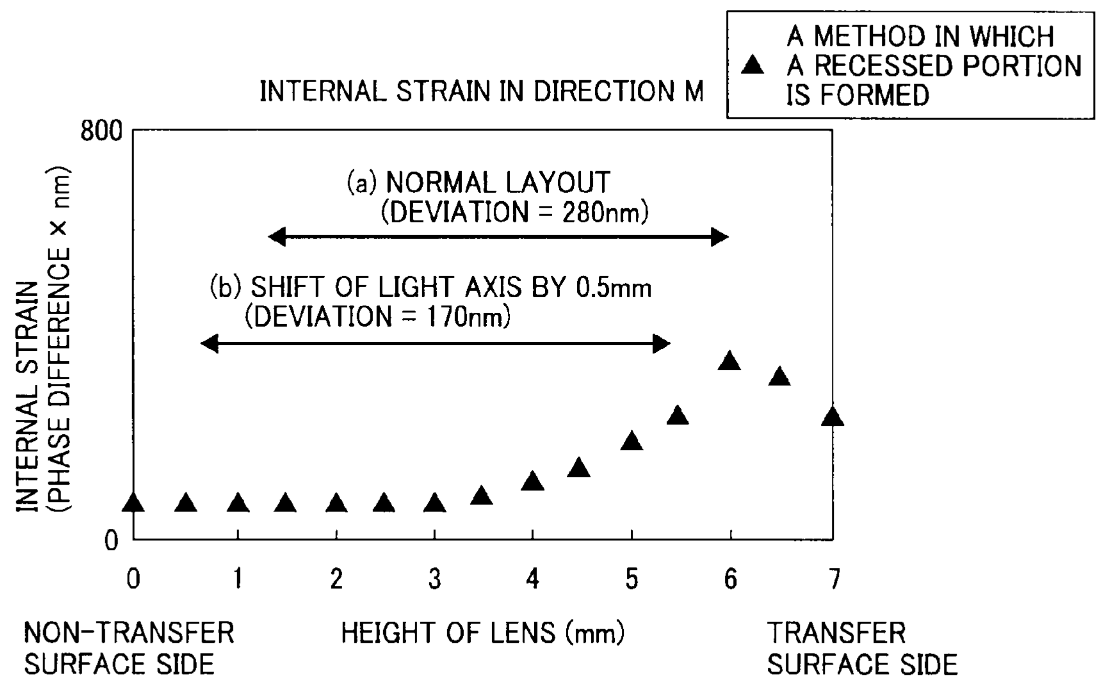
FIG. 7 is a graph illustrating reduction of the internal strain when the optical axis center is shifted.

FIG. 7 illustrates the profile of the internal strain of the fθ lens 6 (having a thickness of 7 mm in the sub-scanning direction and a light beam effective aperture of 5 mm) in the shorter side direction thereof (i.e., in the direction M) when the optical axis center 29 in the shorter side direction is shifted from the dimensional center 28 toward the non-transfer surface having the recessed portion 15 by 0.5 mm.

As illustrated in FIG. 7, by thus shifting the optical axis center 29, the deviation (birefringence) of the internal strain in the shorter-side direction can be reduced by about 40% ((280 nm−170 nm)/280 nm) compared to an fθ lens prepared by a conventional molding method.

Thus, by forming a recessed portion on a surface (i.e., non-transfer surface) other than the transfer surfaces, the absolute amount of internal strain of the molded article (i.e., fθ lens) in the longer side and shorter side directions thereof can be reduced. By mainly using the portion relatively near the non-transfer surface side having the recessed portion in which stress is relieved relatively largely (i.e., the internal strain is relatively small) compared to the portion near the transfer surface side of the molded article, the deviation (birefringence) of the internal strain of the molded article in the shorter side direction can be reduced. Thus, the optical properties (e.g., beam spot diameter) of the fθ lens can be improved (for example, the beam spot diameter is optimized) without changing the molding method therefor.

Figure 8:
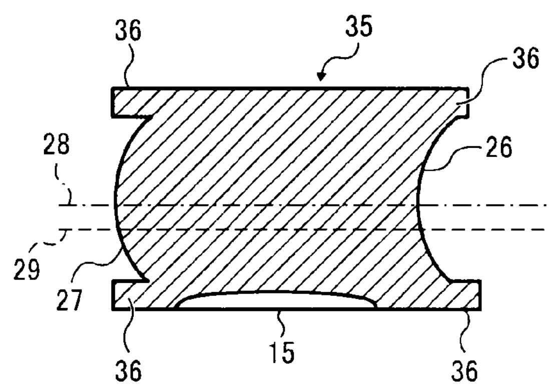
FIG. 8 is a schematic cross-sectional view illustrating another example (fθ lens) of the plastic optical element of the optical scanning device of the present invention.

FIG. 8 illustrates another example (fθ lens) of the plastic optical element for use in the present invention. In FIGS. 6 and 8, like reference characters designate like corresponding parts. Therefore, the parts explained above by reference to FIG. 6 are not explained or are briefly explained here, and the portion specific to the second example will be mainly explained.

An fθ lens 35 has ribs 36 located on the edge portions of the transfer surfaces 26 and 27 (i.e., light entrance surface 26 and light exit surface 27) so as to extend in the optical axis direction. By forming such ribs on the transfer surfaces 26 and 27, entering of the compressed air to the transfer surfaces can be prevented in the molding process. Therefore, even when the fθ lens 35 is prepared using a transparent resin material, occurrence of a problem in that the optical properties of the fθ lens deteriorate due to formation of air bubbles therein can be prevented, and thereby the beam spot diameter property of the fθ lens 35 can be improved (i.e., the beam spot diameter is optimized).

Next, an example (a color laser printer) of the image forming apparatus of the present invention will be explained by reference to FIG. 9.

Figure 9:
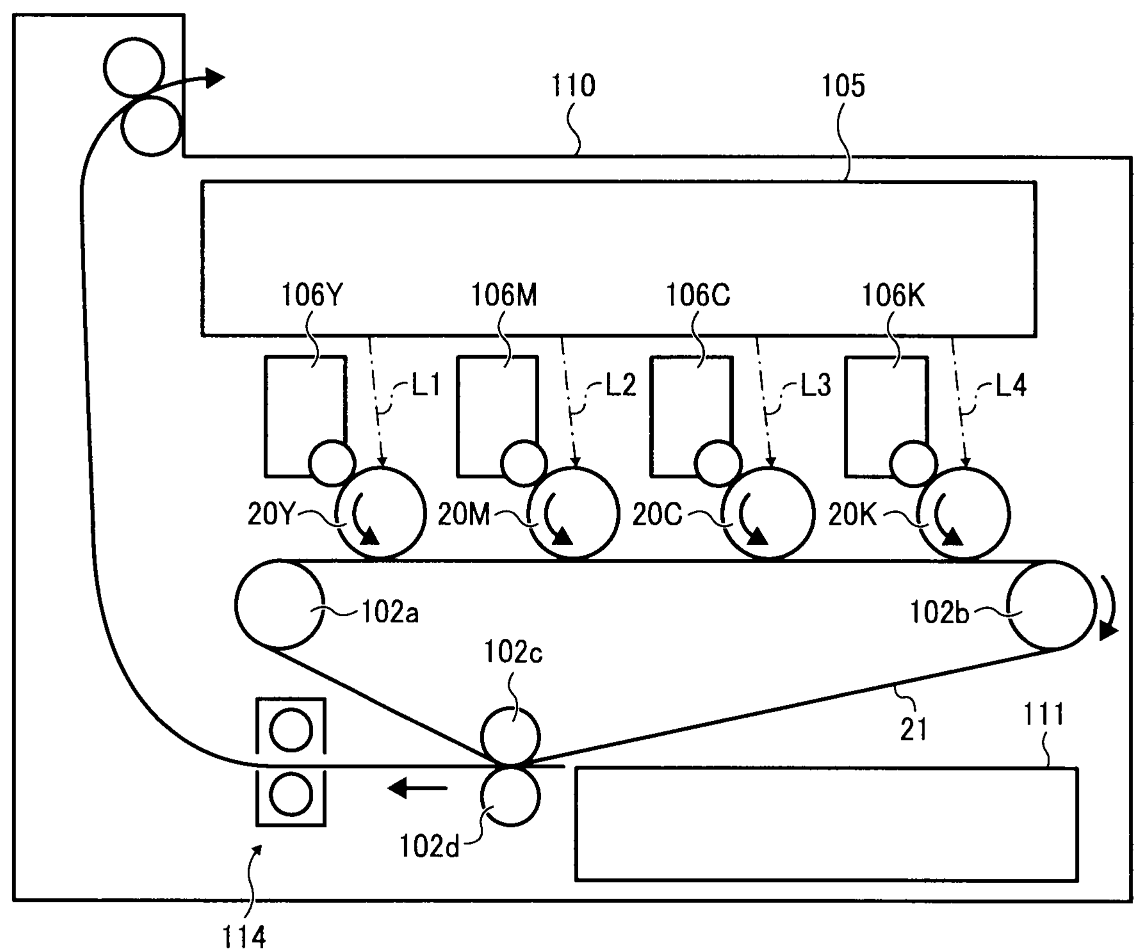
FIG. 9 is a schematic view illustrating an example of the image forming apparatus of the present invention.

Referring to FIG. 9, a laser color printer includes four image forming units (i.e., yellow, magenta, cyan and black image forming units) including respective photoreceptor drums 20Y (for forming yellow (Y) color images), 20M (for forming magenta (M) color images), 20C (for forming cyan (C) color images), and 20K (for forming black (K) color images), which serve as image bearing members; and an intermediate transfer belt 21, which is tightly stretched by rollers 102*a*, 102*b* and 102*c*. As illustrated in FIG. 9, the four photoreceptor drums 20 are arranged along a horizontally extended portion of the intermediate transfer belt 21.

The image forming apparatus further includes an optical scanning device 105 configured to irradiate each of the photoreceptor drums 20 with laser beams L1-L4 to form electrostatic latent images thereon. Since the four image forming units have substantially the same structure, only the yellow image forming unit will be explained.

The yellow image forming unit includes a charging device (not shown) configured to charge the entire surface of the photoreceptor drum 20Y; a developing device 106Y configured to develop an electrostatic latent image on the photoreceptor drum 20Y with a developer including a yellow color toner to form a yellow color toner image on the photoreceptor drum; a primary transfer roller (not shown) provided on an inner surface of the intermediate transfer belt 21 to transfer the yellow color toner image onto the intermediate transfer belt 21 (hereinafter referred to as a primary transfer process); a drum cleaning device (not shown) configured to clean the surface of the photoreceptor drum 20Y after the primary transfer process; a discharging device (not shown) configured to reduce charges remaining on the surface of the photoreceptor drum 20Y even after the primary transfer process; etc. These devices are counterclockwise arranged around the photoreceptor drum 20Y.

Similarly to the above-mentioned yellow color toner image formation, magenta, cyan and black color toner images are formed on the respectively photoreceptor drums 20M, 20C and 20K. The thus prepared yellow, magenta, cyan and black color toner images are transferred onto the intermediate transfer belt 21 at the same time to form a combined color toner image thereon.

On the other hand, a sheet of a receiving material is fed from a cassette 111 toward a secondary transfer roller 102*d*. The combined color toner image on the intermediate transfer belt 21 is transferred onto the receiving material sheet by the secondary transfer roller 102*d* (hereinafter referred to as a secondary transfer process). The thus transferred toner image is fixed by a fixing device 114 upon application of heat and pressure thereto, resulting in formation of a full color image on the receiving material sheet. After the secondary transfer process, the surface of the intermediate transfer belt 21 is cleaned by a belt cleaning device (not shown). As illustrated in FIG. 9, the receiving material sheet bearing the full color toner image thereon is fed upwardly, and then discharged from the main body of the image forming apparatus to a copy tray 110.

The optical scanning device 105 has a structure similar to the first example of the optical scanning device illustrated in FIG. 1, and includes a similar plastic optical element. Although the detailed structure of the optical scanning device 105 is not illustrated in FIG. 9, the optical scanning device has an opposed type scanning structure such that one side of a light deflector scans two of the photoreceptor drums 20 and the opposite side of the light deflector scans the other two photoreceptor drums 20. In reality, plural bending mirrors and plural toroidal lenses are arranged in the optical scanning device 105 to scan plural photoreceptor drums at the same time. Needless to say, the optical scanning device 105 may have a one-side scanning structure such that one side of a light deflector scans the four photoreceptor drums 20 at the same time.

In any case, the fθ lens (i.e., plastic optical element) of the optical scanning device 105 has a configuration such that the optical axis center of the fθ lens in the shorter side direction is shifted from the dimensional center thereof similarly to the fθ lens illustrated in FIG. 6 or 8.

In the above examples, fθ lens are exemplified as the plastic optical element. However, the plastic optical element for use in the present invention is not limited thereto. By applying the above-mentioned technique to other plastic optical elements, the optical properties of the plastic optical elements can be enhanced.

In addition, the plastic optical element can also be used for other optical devices such as video cameras.

Further, the image forming apparatus of the present invention is not limited to printers, and can be used for copiers, facsimiles, plotters, etc.

This document claims priority and contains subject matter related to Japanese Patent Application No. 2008-066704, filed on Mar. 14, 2008, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical scanning device for scanning a member with light, comprising:

a light source configured to emit a light beam;

a light deflector configured to deflect the light beam; and a focusing optical system configured to guide the deflected light beam to a predetermined position of the member and including a plastic optical element, wherein the plastic optical element is molded using a die and guides the light beam to the predetermined position of the member, and wherein the plastic optical element includes:

at least two transfer surfaces, which are formed by contacting with transfer surfaces of the die and which include:

a light entrance surface from which the light beam enters; and a light exit surface from which the light beam exits;

a third surface including a non-transfer surface formed without contacting a transfer surface of the die using compressed air; and four ribs, each formed on one of the transfer surfaces and each extending away from a center of the plastic optical element in a direction parallel to an optical axis of the plastic optical element, two of the ribs extending in one direction, and another two of the ribs extending in a direction opposite said one direction, the ribs preventing the compressed air from forming air bubbles in the light entrance surface and the light exit surface, wherein the deflected light beam passes through the plastic optical element in such a manner that an optical axis center of the deflected light beam extends in a direction parallel to a shorter side of the plastic optical element while being shifted from a dimensional center of the plastic optical element toward the third surface thereof.

2. The optical scanning device according to claim 1, wherein the plastic optical element is molded from a transparent resin.

3. The optical scanning device according to claim 1, wherein the plastic optical element is an fθ lens.

4. An image forming apparatus comprising:

an image bearing member configured to bear an electrostatic image thereon;

the optical scanning device according to claim 1 configured to guide a light beam to a predetermined position of the image bearing member and to scan the image bearing member with the light beam to form the electrostatic image on a surface of the image bearing member.

5. An optical scanning method for guiding light to a predetermined position of a member to scan the member with light, comprising:

emitting a light beam;

deflecting the light beam; and guiding the deflected light beam to the member through a plastic optical element in such a manner that an optical axis center of the deflected light beam extends in a direction parallel to a shorter side of the plastic optical element while being shifted from a dimensional center of the plastic optical element toward a surface thereof having a non-transfer surface, wherein the plastic optical element is molded using a die and includes:

at least two transfer surfaces, which are formed by contacting with transfer surfaces of the die and which include:

a light entrance surface from which the light beam enters;

a light exit surface from which the light beam exits; and four ribs, each formed on one of the transfer surfaces and each extending away from a center of the plastic optical element in a direction parallel to an optical axis of the plastic optical element, two of the ribs extending in one direction, and another two of the ribs extending in a direction opposite said one direction; and the surface including the non-transfer surface formed without contacting a transfer surface of the die using compressed air, wherein the ribs prevent the compressed air from forming air bubbles in the light entrance surface and the light exit surface.

* * * * *